July 11, 1933.                    C. W. PLOEN                    1,917,542
BLOW-OFF MUFFLER
Filed Jan. 31, 1929
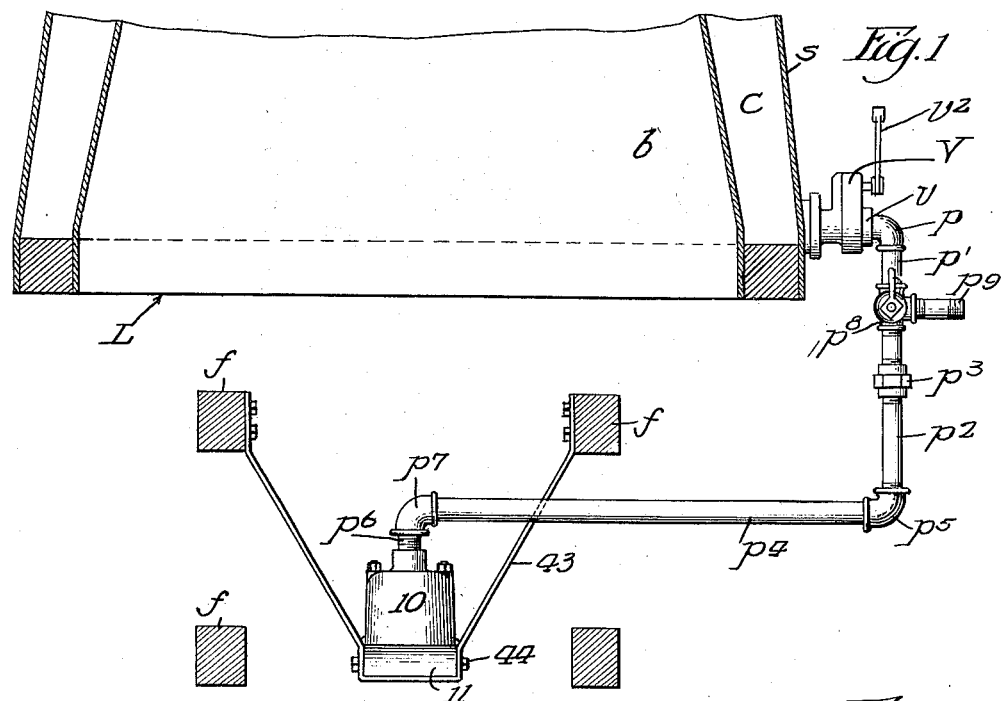
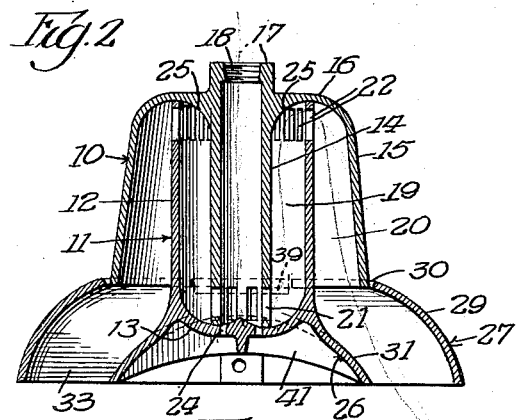
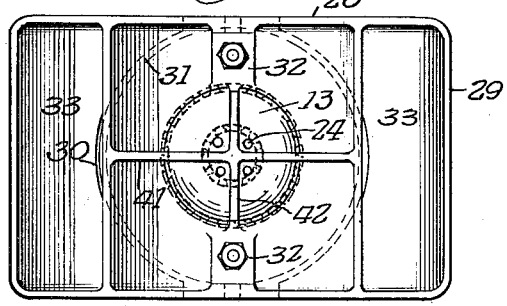
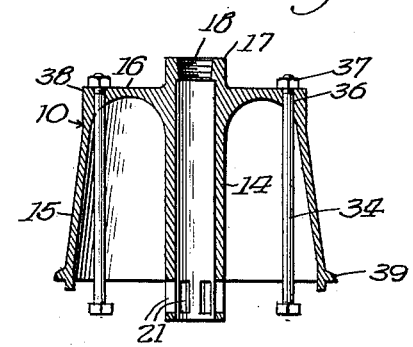
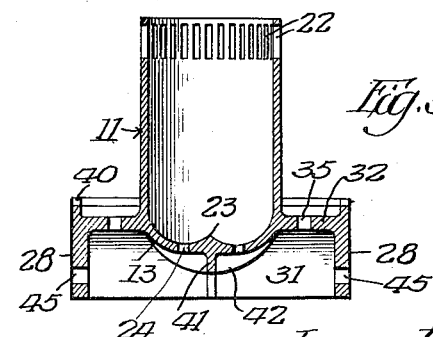
Inventor
Curtis W. Ploen
By Fred Gerlach
his Atty.

Patented July 11, 1933

1,917,542

UNITED STATES PATENT OFFICE

CURTIS W. PLOEN, OF CHICAGO, ILLINOIS, ASSIGNOR TO THE OKADEE COMPANY, OF CHICAGO, ILLINOIS, A CORPORATION OF ILLINOIS

BLOW-OFF MUFFLER

Application filed January 31, 1929. Serial No. 336,579.

The present invention relates generally to mufflers for blow-off pipes and more particularly to that type of muffler which is adapted for connection to the blow-off valve of a locomotive steam engine and is operative, during the blow-off operation, to muffle the exhausted fluid and to diffuse it so that there will be no intense blast or jet which if directed laterally might injure persons or objects immediately adjacent the engine, or if directed downwardly would tend to disintegrate or damage the subjacent roadbed.

One object of the invention is to provide a muffler of the aforementioned type consisting of two one-piece metal members one of which comprises a pipe-element for connection to the blow-off valve and a bell-shaped wall extending around and connected to one end of the element, and the other of which embodies a cylindrical wall positioned in telescoping or interembracing relation with respect to the bell-shaped wall and pipe-element and spaced therefrom to form a pair of annular conduits or passages.

Another object of the invention is to provide a muffler of this character in which the member that embodies the cylindrical interembracing wall comprises in addition to such wall a rim which fits loosely around the free end of the bell-shaped wall and cooperates with a deflector to form a pair of discharge openings whereby the fluid is received from the outermost conduit and discharged to atmosphere in two separate and comparatively weak streams.

A further object of the invention is the provision of improved means for securing together in locked relation the cast metal members, which means comprises lug and socket connections beween the rim and bell-shaped wall.

A still further object of the invention is to provide a muffler for use in connection with a blow-off valve, which is of novel construction and may be manufactured more readily and economically than mufflers for a similar purpose now in use or proposed heretofore, and in which facility of replacement of the various members is combined with durability and compactness of construction.

Other objects and the various advantages and characteristics of the present muffler construction will be apparent from a consideration of the following detailed description.

The invention consists in the several novel features hereinafter set forth and more particularly defined by the claims at the conclusion hereof.

In the drawing which accompanies and forms a part of this specification or disclosure and in which like numerals of reference denote corresponding parts throughout the several views:

Figure 1 is an end elevation of a muffler embodying the invention, showing the same in connected relation with the blow-off valve of a locomotive steam engine;

Figure 2 is a vertical longitudinal section of the improved muffler;

Figure 3 is an inverted plan view;

Figure 4 is a transverse sectional view of the muffler-member that is composed of the pipe-element and bell-shaped wall; and Figure 5 is a vertical transverse sectional view of the other muffler-member.

The invention is exemplified in a muffler which is adapted primarily for use in connection with the blow-off valve V of a locomotive steam engine L. By way of explanation it is here stated that the blow-off valve operates, upon opening thereof, to cleanse and reduce the pressure in the compartment $c$ around the fire box $b$ of the engine, and generally is connected to one of the side sheets $s$ of the boiler and located adjacent the front corner of the mud band. The muffler which forms the subject matter of the present invention is preferably disposed beneath the boiler and is supported from the frame $f$ of the locomotive. It may be connected to the blow-off valve by any suitable pipe system, such, for example, as that disclosed in Figure 1 of the drawing, which system comprises an elbow $p$, one end of which is threaded and connected to the outlet port $v$ of the blow-off valve; a pipe $p'$ which is connected to the other end of the elbow $p$ and extends downwardly; a pipe $p^2$ which forms a continuation of the pipe $p'$ and is connected thereto by a union $p^3$; a pipe $p^4$ which extends under the boiler and has the outer end thereof connected to the lower end of the pipe $p^2$ by an elbow $p^5$; and a vertically extending externally threaded nipple $p^6$ the upper end of which is connected to the inner end of the pipe $p^4$ by an elbow $p^7$. The pipe $p'$ is preferably formed in sections and has connected thereto a three way valve $p^8$ which is provided with a laterally extending discharge nipple $p^9$ and is operative when the plug thereof is in one of its positions to conduct or by-pass the exhausted fluid through said nipple $p^9$. In its normal position, however, the plug is positioned so that the nipple $p^9$ is closed and the muffler is operatively connected to the blow-off valve. The latter is provided with a handle $v^2$ which is operated from the cab of the locomotive, as well understood in the art.

The improved muffler operates to muffle and diffuse the fluid that is exhausted through the pipe system. It consists of a one-piece top member 10 and a one-piece bottom member 11. Both of these members are castings preferably made of iron. The bottom muffler-member 11 comprises a vertically extending cylindrical wall 12, the lower end of which is closed by a concavo-convex bottom wall 13. The upper muffler-member 10 is composed of a vertically extending pipe-element 14 and a bell-shaped wall 15, which is of a materially larger diameter than the pipe-element and extends therearound in concentric relation. The bell-shaped wall is flared downwardly and embodies a horizontal top 16 which is joined to and formed integrally with the upper end of the pipe-element 14. The extreme upper end of the pipe-element projects a short distance above the top 16 to form an inlet nipple 17 at the top of the muffler. This nipple has formed therein an internal screw thread 18 for connection to the external thread on the pipe-nipple $p^6$. The lower end of the pipe-element 14 extends a short distance below the lower marginal portion of the wall 15. The muffler-members 10 and 11 are connected together so that the cylindrical wall 12 is concentrically positioned between the pipe-element 14 and the bell-shaped wall and the lower end of said pipe-element abuts directly against the bottom wall 13. The cylindrical wall 12 is of such diameter that it is positioned substantially medially with respect to the wall and pipe-element of the top-member 10 and its upper end is extended so as to abut directly against the top 16. The two walls 12 and 15 together with the pipe-element form two vertically extending and concentrically disposed annular passages or conduits 19 and 20. The exhausted fluid passes to the lower end of the innermost conduit 19 from the longitudinal duct in the pipe-element 14 through a circular series of vertically extending slots 21. These slots are formed in the part of the pipe-element that projects beneath the rim or the lower marginal portion of the wall 15 and serve to direct the exhausted fluid radially outwards and against the marginal part of the concaved upper surface of the bottom wall 13. This concave surface portion deflects the fluid upwardly through the conduit 19. From the upper end of said conduit 19 the fluid passes to the outermost conduit 20 through an annular series of vertically extending slots 22. These last mentioned slots are formed in the upper end of the cylindrical wall 12 and serve to avert the fluid radially outwards and into engagement with the curved connecting portion between the top 16 and the annular skirt of the bell-shaped wall 15. This curved connecting portion deflects the fluid downwardly through the conduit 20. By having the conduits concentrically arranged and connected as set forth and shown, the fluid entering the inlet nipple 16 of the muffler is caused to travel in a sinuous or tortuous path and from one conduit to a larger conduit for purposes of expansion. This results in an efficient and effective muffling and diffusion of the fluid.

The central and top portion of the bottom wall 13 is provided with an upwardly extending substantially conoidal protuberance 23 which extends axially into the lower end of the pipe-element 14 and operates as a deflector whereby the fluid passing through the duct of the pipe-element is directed laterally through the slots 21. A plurality of apertures 24 extend through the bottom wall 13 to drain the muffler of any condensate that may be included with the exhausted fluid. These apertures are located adjacent the base portion of the conoidal protuberance 23 and communicate with the lower end of conduit 19. The portion of the top 16 adjacent and joined to the pipe-element 14 embodies a downwardly tapered annular part 25, the peripheral portion of which is curved so as to deflect the fluid from the upper end of the conduit 19 through the slots 22. The latter, as well as the slots 21 embody outwardly convergent sides and are substantially trapezoidal in cross section with the result that they may be formed during the casting of the muffler-members and diffusion of the fluid is facilitated.

In addition to the bottom wall 13 and the cylindrical wall 12, the bottom muffler-member comprises a deflector 26 and a rectangular rim 27. The rim 27 consists of a pair of flat and coextensive parallel sides 28 and a pair of ends 29. The sides are elongated, extend vertically and are spaced apart a distance substantially to the largest diameter of the wall 15. The ends 29 slope upwardly and inwardly and have the top edges thereof shaped to form a circular opening 30 in which the lower marginal portion of the wall 15 loosely fits. The deflector 26 consists of a pair of end sections 31 which extend transversely across and are united to the sides 28. These end sections 31 are positioned inwardly of the ends 29 and they extend upwardly and inwardly from the bottom edges of the sides 28. The upper and central parts of said end sections are connected to the united margins of the cylindrical wall 12 and the bottom wall 13. The upper and outer parts of the sections 31 are united adjacent the sides of the cylindrical wall 12 by portions 32 which extend diametrically across the lower end of the conduit 20. The deflector, by being formed in the manner herein described, cooperates with the ends 29 to form a pair of downwardly facing discharge outlets 33. The fluid from the conduit 20 is exhausted in two substantially large streams through these outlets. By reason of the fact that the deflector-sections 31 extend outwardly, the fluid is discharged endwise as well as downwardly.

The muffler-members 10 and 11 are secured together by a pair of bolts 34. These bolts extend upwardly through aligned holes 35 and 36 which are formed in the portions 32 and the top 16 respectively. The bottom faces of the portions 32 are flat, as shown in Figure 3, to receive the heads of the bolts. The extreme upper end parts of the bolts extend beyond the top 16 and are provided with nuts 37. The latter fit against flat portions 38 on the top 16 and when tightened, serve to draw or clamp the muffler-members together. The portions 38 are in the nature of lugs which are formed integrally with top surface of the top 16 and are arranged diametrically opposite each other. To prevent rotation of the muffler-member 10 relatively to the bottom member 11, a pair of lugs 39 are provided. These lugs are formed integrally with the rim or lower marginal portion of the bell-shaped wall 15 and are located adjacent the sides of the rim 27. They are adapted to fit into open top sockets or recesses 40 which are formed in the central and upper portions of the sides 28.

The central portion of the lower muffler member 11 is reenforced by a pair of ribs 41 and 42. The rib 41 extends longitudinally and is crescent shaped. It is formed integrally with the bottom surfaces of the bottom wall 13 and the deflector sections 31. The rib 42 extends at right angles to the rib 41 and is formed integrally with the bottom wall 13.

The muffler is suspended or supported in any suitable manner, such, for example, as the means shown, which consists of a strap 43, the ends of which extend upwardly and are connected to the upper pair of the longitudinal beams of the locomotive frame *f*. The intermediate or central part of the strap is bent so as to be U-shaped and is adapted to receive and extend transversely across the rim 27 of the bottom muffler-member. The legs of this U-shaped part are attached to the sides 28 by bolts 44 which extend through holes 45 in the central portions of said sides 28.

The operation of the muffler is as follows: When steam or fluid from the compartment *c* of the locomotive is discharged into the inlet nipple 17, it passes downwardly to the lower end of the pipe-element 14 and is there deflected outwards by the protuberance 23 so as to pass through the slots 21. From these slots, the fluid passes upwardly through the conduit 19 to the annular part 25 of the top 16. The latter operates to direct the fluid laterally or radially outwards through the slots 22. From these slots the fluid passes downwardly through the annular conduit 20 and thence to atmosphere by way of the two discharge outlets 33. The streams emanating from these outlets are extremely weak and without noise due to the fact that the energy or pressure of the fluid is expended as it passes back and forth in the conduits and through the slots. To disconnect the muffler-members for cleaning or repair purposes, the strap 43 is first removed and then the nuts 37 are removed from the threaded ends of the bolts. After this operation, the lower muffler-member 11 is free so that it may be dropped from engagement with the top member 10.

The muffler herein disclosed may be manufactured at a comparatively low cost because it consists essentially of but two cast iron members. In addition, it is durable and compact and the construction thereof tends toward efficiency in the muffling and diffusion of the fluid.

Although the muffler has been described in connection with a blow-off valve of a locomotive steam engine and as consisting of two members positioned one above the other, it is to be understood that the muffler may be utilized with any type of steam blow-off pipe and positioned so that the members extend horizontally in side by side relation. It is also to be understood that the invention is not to be understood as restricted to the details set forth, since these may be modified within the scope of the appended claims, without departing from the spirit and scope of the invention.

Having thus described the invention, what I claim as new and desire to secure by Letters Patent, is:

1. A blow-off muffler embodying a fluid inlet and comprising a pair of members having tubular telescoping walls spaced laterally apart and operative to form a plurality of concentric annular conduits through which the fluid is passed successively, and cross-walls for closing certain of the ends of the conduits, one of the members being provided with an integral deflector and a rim extending around the deflector and cooperating therewith to form a discharge opening substantially aligned with the exhaust end of the outermost conduit and adapted to permit the fluid to pass therethrough to atmosphere.

2. A blow-off muffler embodying a fluid inlet and comprising a pair of members having tubular telescoping walls spaced laterally apart and operative to form a plurality of annular conduits through which the fluid is passed successively, and cross-walls for closing certain of the ends of the conduits, one of the members being provided with an integral deflector and a rim extending around the deflector and cooperating therewith to form a pair of openings for discharging the fluid in two streams from the last travelled conduit.

3. In a muffler of the character described, the combination of a member comprising a pipe-element having one end thereof adapted to receive fluid from a blow-off pipe and a substantially bell-shaped wall extending around said pipe-element and having the end thereof connected to the said one end of the element; a one-piece casting comprising a substantially cylindrical wall extending between and spaced laterally from the bell-shaped wall and pipe-element to form a pair of concentric annular conduits through which the fluid passes successively, an end wall for said cylindrical wall positioned adjacent the other end of the pipe-element, and means forming a pair of discharge openings, embodying a deflector joined to the meeting margins of the end and cylindrical walls, and a rim extending around the deflector and having an opening in which fits the free margin of the skirt of the bell-shaped wall; and means for securing the member and casting in connected relation.

4. In a muffler of the character described, the combination of a member comprising a pipe-element having one end thereof adapted to receive fluid from a blow-off pipe and a substantially bell-shaped wall extending around said pipe-element and having the end thereof connected to the said one end of the element; a one-piece casting comprising a substantially cylindrical wall extending between and spaced laterally from the bell-shaped wall and pipe-element to form a pair of concentric annular conduits through which the fluid passes successively, an end wall for said cylindrical wall positioned adjacent the other end of the pipe-element, and means forming a pair of discharge openings, embodying a deflector joined to the meeting margins of the end and cylindrical walls, and a rim extending around the deflector and having an opening in which fits the free margin of the skirt of the bell-shaped wall; and means for securing the member and casting in connected relation, comprising bolts extending through the deflector and the end of said bell-shaped wall.

5. In a muffler of the character described, the combination of a member comprising a pipe-element having one end thereof adapted to receive fluid from a blow-off pipe and a substantially bell-shaped wall extending around said pipe-element and having the end thereof connected to the said one end of the element; a one-piece casting comprising a substantially cylindrical wall extending between and spaced laterally from the bell-shaped wall and pipe-element to form a pair of concentric annular conduits through which the fluid passes successively, an end wall for said cylindrical wall positioned adjacent the other end of the pipe-element, and means forming a pair of discharge openings, embodying a deflector joined to the meeting margins of the end and cylindrical walls, and a rim extending around the deflector and having an opening in which fits the free margin of the skirt of the bell-shaped wall; and means for locking the member and casting together, comprising a lug and socket connection between the rim and the skirt of said bell-shaped member.

Signed at Chicago, Illinois, this 25th day of January, 1929.

CURTIS W. PLOEN.